United States Patent

Wakatani et al.

[11] Patent Number: 5,909,508
[45] Date of Patent: *Jun. 1, 1999

[54] PARALLEL IMAGE-CLUSTERING APPARATUS

[75] Inventors: Akiyoshi Wakatani, Hirakata; Yoshiteru Mino, Katano, both of Japan

[73] Assignee: Matsushita Electric Industrial Co., Ltd., Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/636,114

[22] Filed: Apr. 22, 1996

[30] Foreign Application Priority Data

Apr. 24, 1995 [JP] Japan .................................... 7-098199

[51] Int. Cl.⁶ .............................. G06K 9/00; G06K 9/54; G06K 9/60; G06K 9/62
[52] U.S. Cl. .......................... 382/225; 382/181; 382/224; 382/304
[58] Field of Search ..................................... 382/157, 225, 382/304, 181, 220, 224

[56] References Cited

U.S. PATENT DOCUMENTS

| | | | |
|---|---|---|---|
| 3,643,215 | 2/1972 | Ingham et al. | 382/225 |
| 5,040,133 | 8/1991 | Feintuch et al. | 382/225 |
| 5,060,277 | 10/1991 | Bokser | 382/225 |
| 5,075,896 | 12/1991 | Wilcox et al. | 382/225 |
| 5,299,284 | 3/1994 | Roy | 395/22 |
| 5,519,789 | 5/1996 | Etoh | 382/225 |

FOREIGN PATENT DOCUMENTS 6-150000  5/1994  Japan .

OTHER PUBLICATIONS

D.E. Rumelhart et al., "Feature Discovery by Competitive Learning", Chapter 5 of "Parallel Distributed Processing", published by MIT Press, 1986, pp. 151–193.

*Primary Examiner*—Bipin H. Shalwala
*Assistant Examiner*—Daniel G. Mariam
*Attorney, Agent, or Firm*—Panitch Schwarze Jacobs & Nadel, P.C.

[57] ABSTRACT

In an image clustering apparatus for classifying an image into plural clusters, modification of cluster parameter is executed by parallel processing as well as parallel processing of comparison of likelihood.

3 Claims, 8 Drawing Sheets

PARALLEL IMAGE-CLUSTERING APPARATUS

FIELD OF THE INVENTION AND RELATED ART STATEMENT

1. Field of the Invention

The present invention relates to a parallel image-clustering apparatus for classifying image data into plural clusters which is utilized in a field of image processing such as a video phone.

2. Description of the Related Art

A coding system of MPEG4 (Moving Picture Experts Group 4) has lately attracted considerable attention as an image compression technique for the next generation. According to one example of MPEG4, compression method for respective layers has been proposed. A core technique of the above-mentioned method is to collect picture segments having motion of objects similar to each other from among all moving pictures.

To compress the moving pictures which are typically natural moving pictures, it is considered that the picture segments which are similar to each other constitute one layer. Compression methods are selected for every layer, thereby reducing amount of codes as a whole.

A layer consists of plural clusters. For example, an image of a car (as a layer) consists of a cluster of persons sitting on seats, a cluster of tires, a cluster of a body and clusters of others.

It is therefore necessary for determination of the layer to find out one cluster which includes picture elements having similar nature in brightness and color etc. This operation is known as clustering. The clustering is performed by a set of processes of the first half and the latter half. In the first half, parameters for constituting a cluster are picked out from among parameters of a picture element selected at random, to determine a cluster configuration. In the latter half, it is determined which picture elements belong to which clusters. Hereafter, attention is directed only to the first half.

Figure 4:
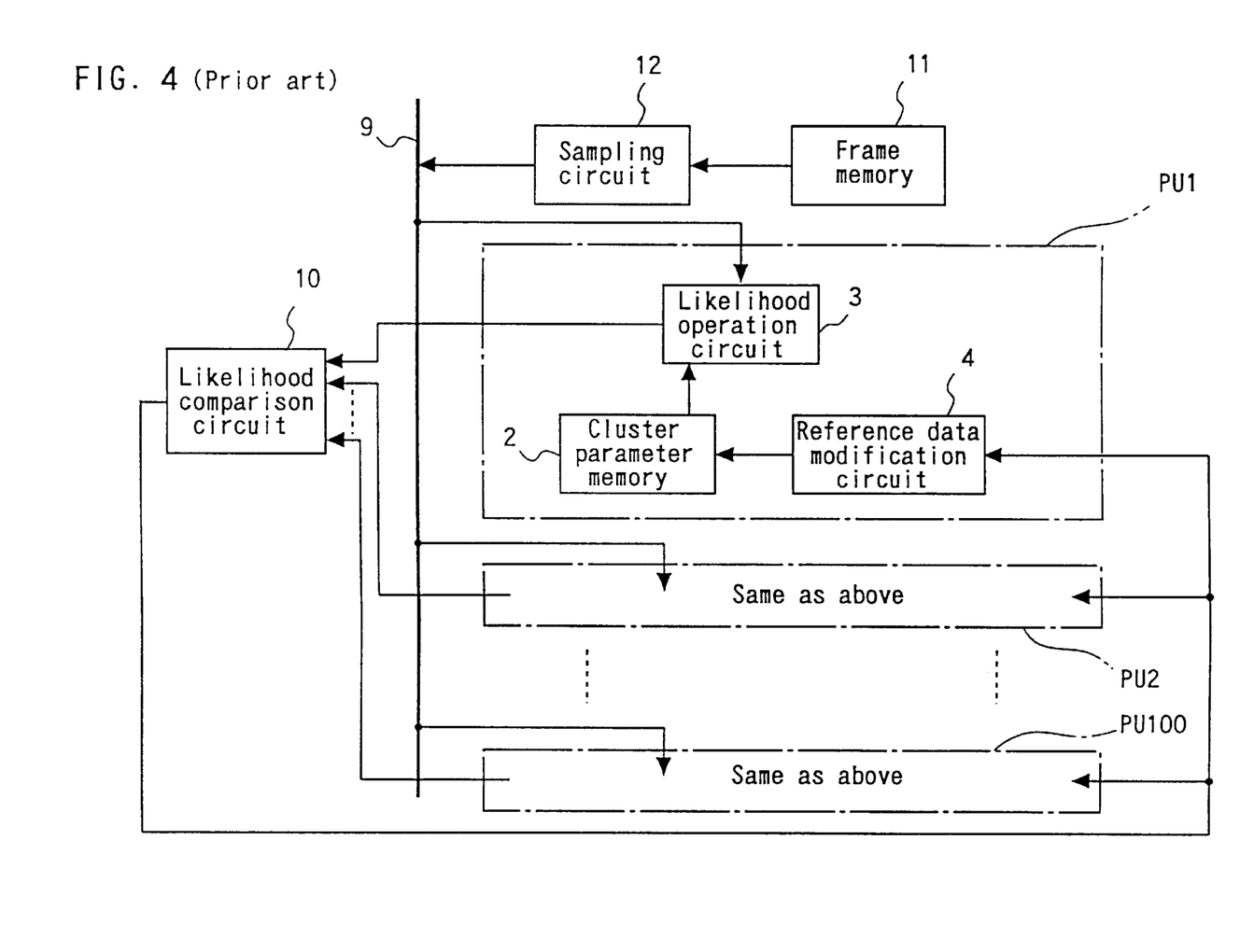
FIG. 4 is a block diagram showing the conventional image clustering apparatus.

FIG. 4 is a block diagram showing the conventional parallel image-clustering apparatus disclosed in Japanese unexamined patent publication (TOKKAI) Hei 6-150000. The parallel image-clustering apparatus shown in FIG. 4 includes plural (e.g., one hundred) processing units PU1 - - - PU100, a likelihood comparison circuit 10, a frame memory 11 and a sampling circuit 12. The sampling circuit 12 and the processing units PU1 - - - PU100 are connected to each other via a transmission line 9. Each of the processing units PU1 - - - PU100 includes therein a cluster parameter memory 2, a likelihood operation circuit 3 and a reference data modification circuit 4. The likelihood operation circuit 3 calculates a likelihood (Maharanobis distance for a parameter) between a picture element selected in the sampling circuit 12 and a parameter stored in the cluster parameter memory 2.

The likelihood comparison circuit 10 selects a cluster having the maximum likelihood within all likelihoods calculated in the respective processing units PU1 - - - PU100. The cluster of the maximum likelihood has the minimum Maharanobis distance. The reference data modification circuit 4 modifies the parameter of the selected cluster in compliance with delta rule of competitive learning.

The above-mentioned process is repeated until the cluster is finally decided.

In the above-mentioned process, calculation of likelihood is executed by parallel processing in the respective processing units PU1 - - - PU100, whereas modification of parameter is executed sequentially because the modification of parameter is performed in only a specific processing unit.

Figure 8:
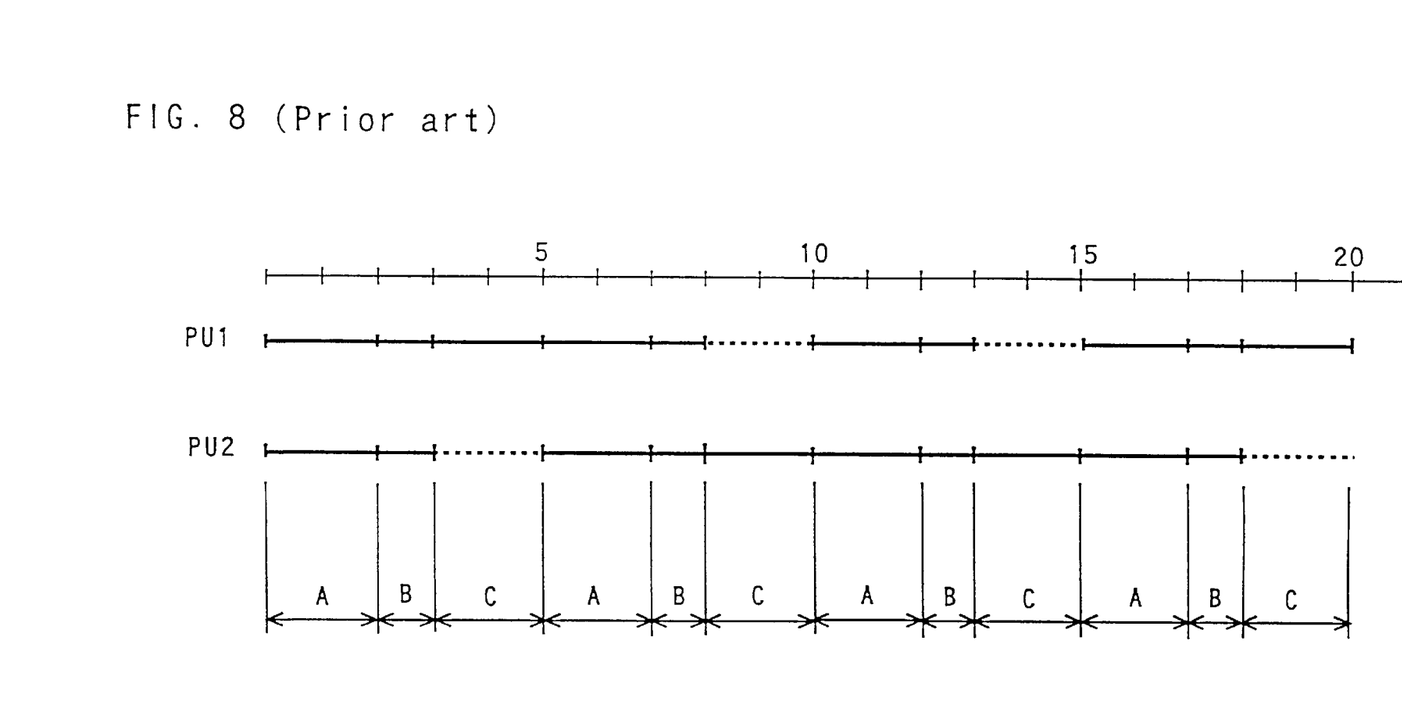
FIG. 8 is a time chart in the conventional image clustering apparatus.

FIG. 8 is a time chart showing the abovementioned process of the prior art. In FIG. 8, each of letters "A" designates a period for calculation of likelihood. Each of letters "B" designates a period for comparison of likelihood, and each of letters "C" designates a period for modification of parameter. It takes two time-unit to execute calculation of likelihood or execute modification of parameter. It takes one time-unit to execute comparison of likelihood. In an example shown in FIG. 8, it is supposed that number of the processing units is two and number of sampling is four. As is apparent from the figure, the first calculation of likelihood and the subsequent comparison of likelihood are completed at a point in time when three time-unit have elapsed. Since it takes two time-unit for one processing unit to modify the parameter, it takes so long time as 20 time-unit to complete four sampling.

As has been described, it takes long time for the conventional apparatus to perform the clustering.

OBJECT AND SUMMARY OF THE INVENTION

An object of the present invention is to offer a clustering apparatus which can perform the clustering within a time period shorter than that of the conventional apparatus.

In order to achieve the above-mentioned object, a parallel image-clustering apparatus of the present invention is for classifying an image into a plurality of clusters each being formed by a set of picture elements having similar natures to each other, the apparatus comprising:

a frame memory for storing therein coded picture elements;

a sampling circuit for reading out picture element information at random from the frame memory;

a plurality of processing units, number of which equals to at least number of the clusters, the processing units each including:
  (a) a cluster parameter memory for storing therein parameters defining each nature of a plurality of clusters,
  (b) a likelihood operation circuit for calculating a likelihood based on the parameters and sampling data of image supplied from the sampling circuit,
  (c) a likelihood memory for storing therein data of a likelihood obtained by the likelihood operation circuit,
  (d) a reference data memory for storing therein reference data supplied from an external circuit,
  (e) a reference data modification circuit for modifying data stored in the cluster parameter memory by utilizing the reference data; and a likelihood comparison circuit for comparing together a plurality of likelihoods each stored in the likelihood memory and selecting a cluster having the maximum likelihood, the likelihood comparison circuit inputting reference data to the reference data memory of a processing unit corresponding to a selected cluster.

According to the above-mentioned configuration, modification of cluster parameters are executed by parallel processing, and thereby the apparatus has parallel processing performance proportional to number of clusters.

The present invention is also a parallel image-clustering apparatus for classifying an image into a plurality of clusters each being formed by a set of picture elements having similar natures to each other, the apparatus comprising:

a plurality of processing units, number of which equals to at least number of divided images of one image on frame, each of the processing units including:
  (a) a sub frame memory for storing therein a set of coded picture elements of each of the divided images,
  (b) a sampling circuit for reading out picture element information at random from the sub frame memory,
  (c) a plurality of cluster parameter memories each for storing therein parameters defining each of the clusters,
  (d) a likelihood operation and comparison circuit for calculating respective likelihoods based on the parameters and sampling data of image supplied from the sampling circuit with respect to all the cluster parameter memories and comparing the likelihoods with each other to obtain a cluster having the maximum likelihood,
  (e) a modified data memory for storing therein modified data issued from the likelihood operation and comparison circuit,
  (f) a reference data memory for storing therein reference data supplied thereto from an external circuit,
  (g) a reference data modification circuit for modifying data stored in the cluster parameter memory by utilizing the reference data; and
a transmission line for transmitting the modified data to the reference data memory of each of the processing units.

According to the above-mentioned configuration, calculation of likelihood is executed by parallel processing whose parallel performance based on picture elements is superior to that based on number of clusters.

The present invention is also a parallel image-clustering apparatus for classifying an image into a plurality of clusters each being formed by a set of picture elements having similar natures to each other, the apparatus comprising:
  a plurality of processing units, number of which equals to at least number of divided images of one image on frame, each of the processing units including:
    (a) a sub frame memory for storing therein a set of coded picture elements of a classified image,
    (b) a sampling circuit for reading out picture element information at random from the sub frame memory,
    (c) a plurality of cluster parameter memories each for storing therein parameters defining each of the clusters,
    (d) a likelihood operation and comparison circuit for calculating respective likelihoods based on the parameters and sampling data of image supplied from the sampling circuit with respect to all the cluster parameter memories and comparing the likelihoods with each other to obtain a cluster having the maximum likelihood,
    (e) a modified data memory for storing therein modified data issued from the likelihood operation and comparison circuit,
    (f) a reference data memory for storing therein reference data supplied thereto from an external circuit,
    (g) a reference data modification circuit for modifying data stored in the cluster parameter memory by utilizing the reference data; and
  a transmission line for transmitting the modified data to the reference data memory of predetermined one of the processing units, wherein data modified in the reference data modification circuit of the predetermined one of the processing units is transmitted to the reference data memory of each of the processing units, and the processing units replace the cluster parameters with data of the reference data memory.

According to the above-mentioned configuration, modification of parameter is executed by parallel processing on clusters, and thereby very high parallel processing performance is realized.

While the novel features of the present invention are set forth particularly in the appended claim, the invention, both as to organization and content, will be better understood and appreciated, along with other objects and features thereof, from the following detailed description taken in conjunction with the drawings.

BRIEF DESCRIPTION OF THE DRAWINGS

FIG. 1 through FIG. 4 are block diagrams, wherein:

FIG. 5 through FIG. 8 are time charts, wherein:

DESCRIPTION OF THE PREFERRED EMBODIMENT

Hereafter, preferred embodiments of the present invention will be described with reference to the accompanying drawings.

Figure 1:
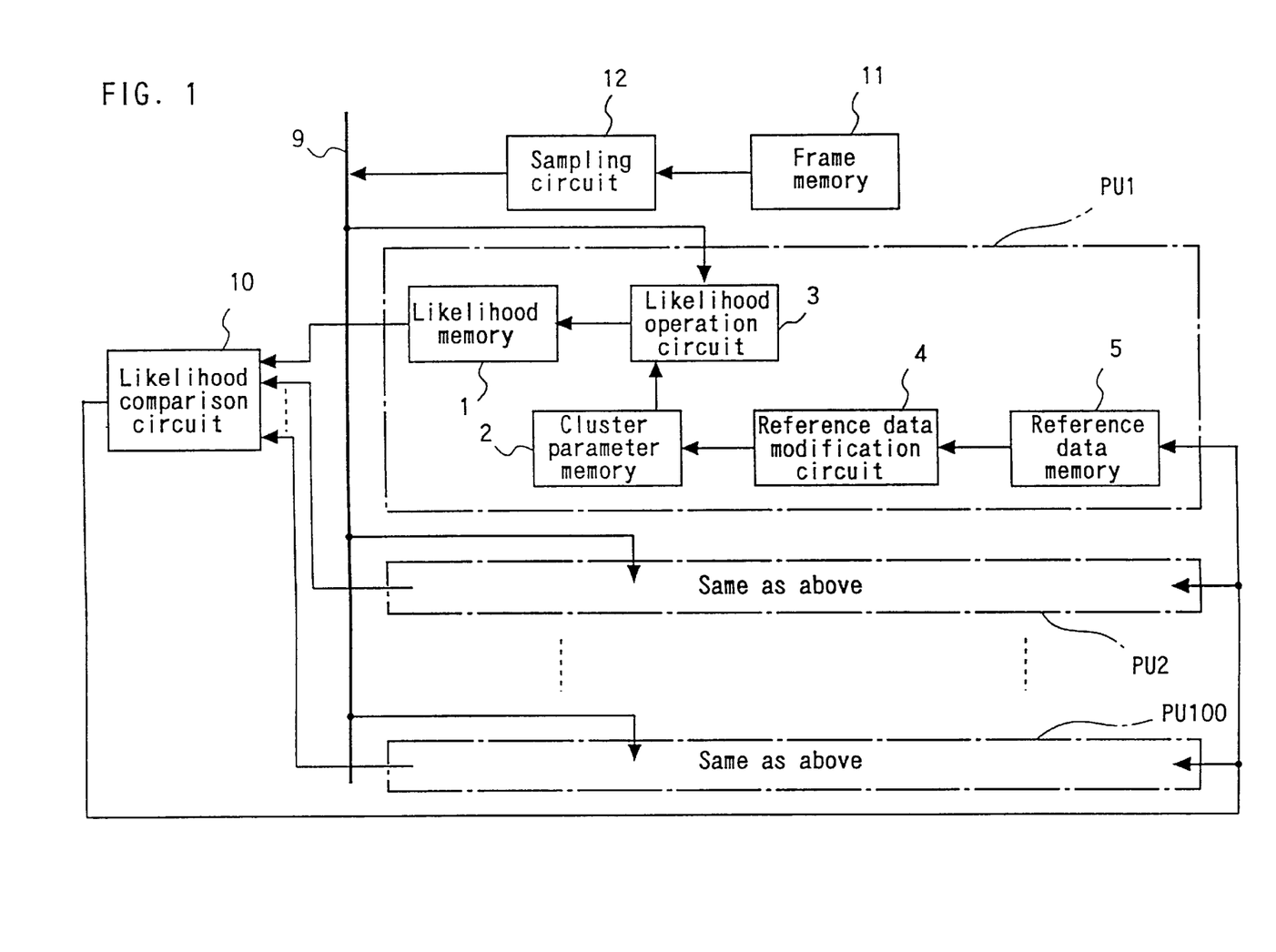
FIG. 1 is a block diagram showing a first embodiment of the present invention.

FIG. 1 is a block diagram showing a parallel image-clustering apparatus in the first embodiment. The parallel image-clustering apparatus shown in FIG. 1 includes plural (e.g., one hundred) processing units PU1 - - - PU100, a likelihood comparison circuit 10, a frame memory 11 and a sampling circuit 12. Number of the processing units PU1 - - - PU100 is not lower than number of clusters. Each of the processing units PU1 - - - PU100 includes therein a likelihood memory 1, a cluster parameter memory 2, a likelihood operation circuit 3, a reference data modification circuit 4 and a reference data memory 5.

The frame memory 11 stores image information. The sampling circuit 12 takes out information of picture elements at random from the frame memory 11. The cluster parameter memory 2 stores a parameter of cluster. This parameter consists of average vector and covariance matrix etc. In all the processing units PU1 - - - PU100, the parameters stored in the respective cluster parameter memories 2 are different from each other. The likelihood operation circuit 3 calculates a likelihood based on the parameter stored in the cluster parameter memory 2 and sampling data input from the sampling circuit 12 via a transmission line 9. The calculated likelihood is temporarily stored in the likelihood memory 1 and issued after completion of the plural sampling.

Likelihoods calculated in the respective processing units PU1 - - - PU100 are input to the likelihood comparison circuit 10. The likelihood comparison circuit 10 selects one of the processing units PU1 - - - PU 100 having the maximum likelihood and transmits reference data to the selected one. In the selected one of the processing units PU1 - - - PU100, an input supplied from the likelihood comparison circuit 10 is temporarily stored in the reference data memory 5. After completion of all the comparison, the reference data modification circuit 4 modifies the data stored in the cluster parameter memory 2 in compliance with the data stored in the reference data memory 5.

Figure 5:
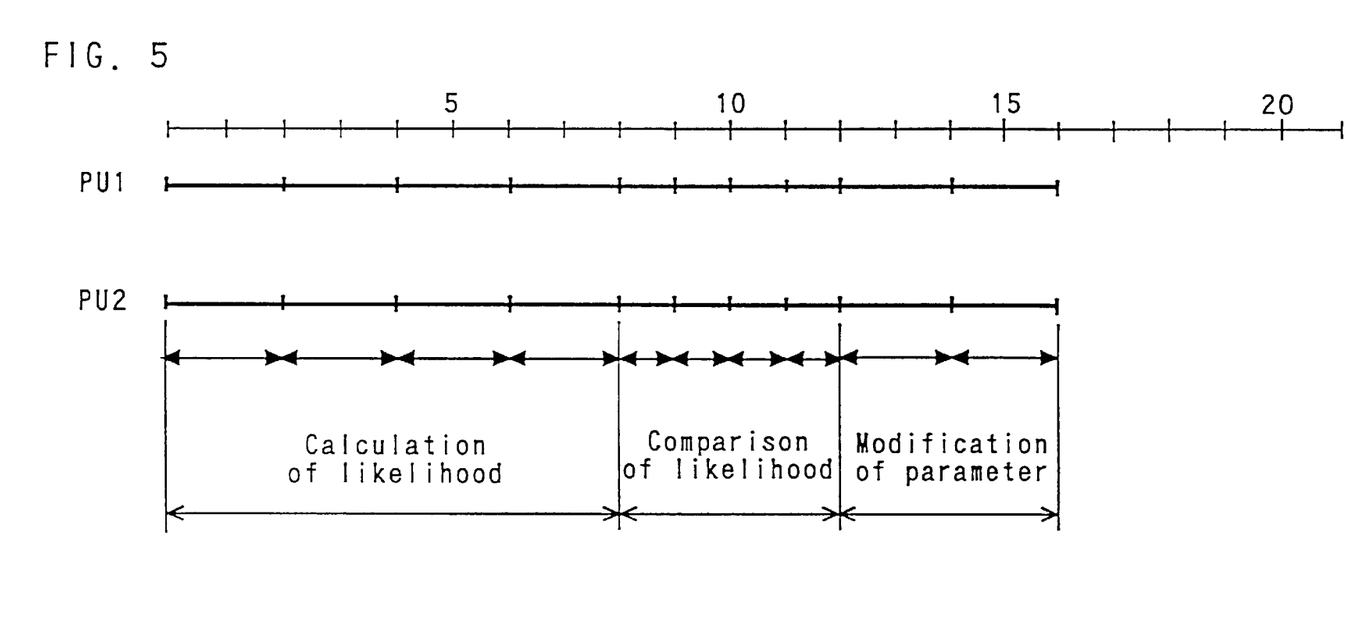
FIG. 5 is a time chart in the first embodiment of the present invention.

Thus, modification of the parameter is executed after completion of plural times sampling, thereby realizing parameter modification procedure which is performed parallel in average on the respective processing units PU1 - - - PU100. FIG. 5 is a time chart showing the above-mentioned parameter modification procedure.

In FIG. 5, it takes two time-unit to execute calculation of likelihood or execute modification of parameter, and it takes one time-unit to execute comparison of likelihood. As an example, it is supposed that number of the processing units is two and number of sampling is four. As is apparent from FIG. 5, first, the calculation of likelihood is executed four times. Comparison of likelihood is subsequently executed. Finally, modification of parameter is executed. Owing to the modification of parameter executed by parallel processing, a running time is thereby shortened. That is, the running time is 16 time-unit which is shorter than the conventional running time (20 time-unit) as shown in FIG. 8.

Figure 2:
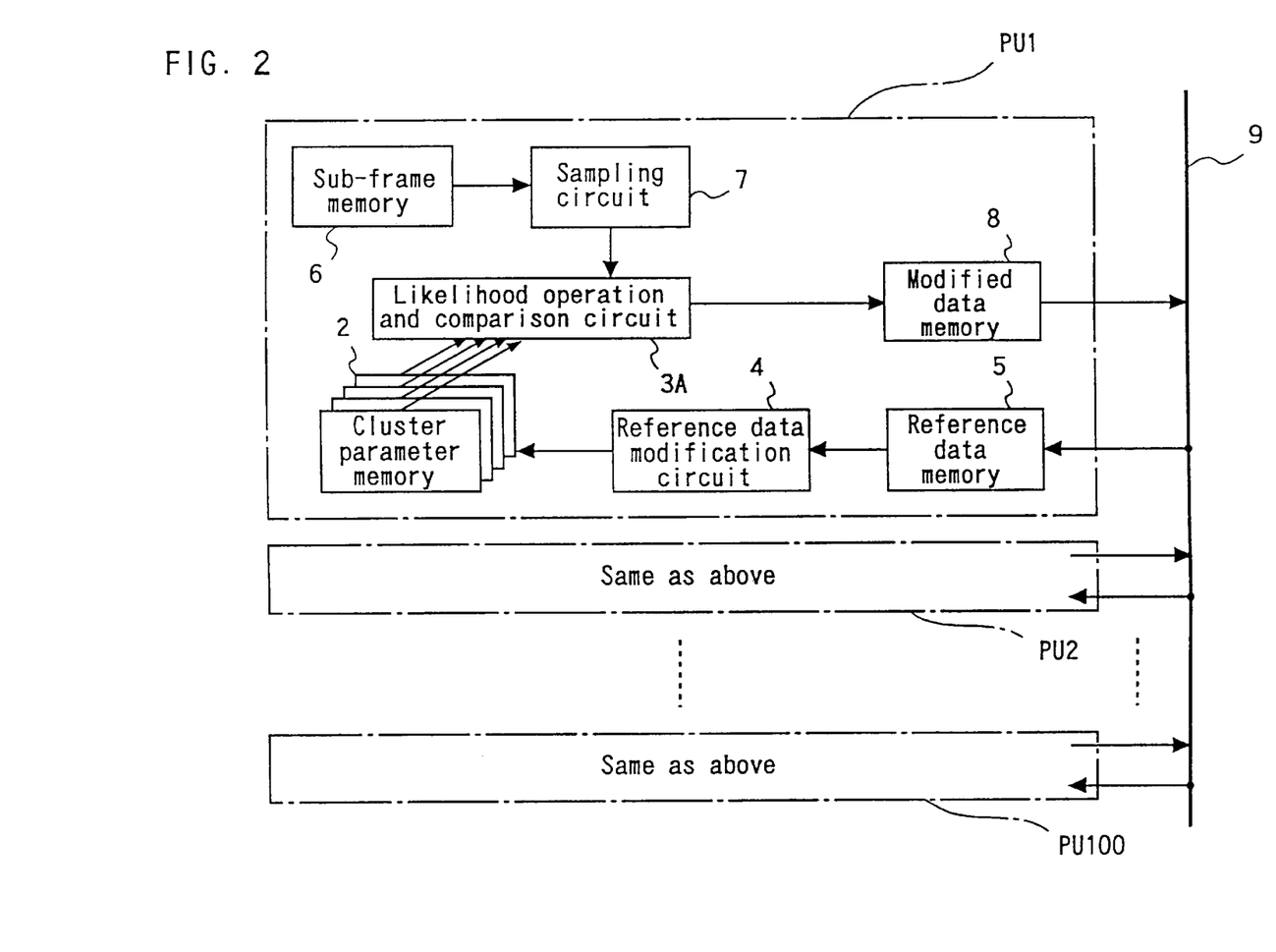
FIG. 2 is a block diagram showing a second embodiment of the present invention.

FIG. 2 is a block diagram showing the parallel image-clustering apparatus of the second embodiment. The apparatus shown in the figure includes plural (e.g., one hundred) processing units PU1 - - - PU100 connected to a transmission line 9. Number of the processing units PU1 - - - PU100 is no smaller than number of divided images (i.e., a set of sub-frames) which constitute one image on frame.

In each of the processing units PU1 - - - PU100, a sub-frame memory 6 stores image information which has been classified. A sampling circuit 7 takes out information of picture elements at random from the sub-frame memory 6. In this second embodiment, calculation of likelihood is executed for every picture element. Therefore, an image is separately stored in each sub-frame memory 6 on all the processing units PU1 - - - PU100. A cluster parameter memory 2 stores parameters of all the clusters, and contents of them are common to all the processing units PU1 - - - PU100. A likelihood operation and comparison circuit 3A calculates a likelihood based on the parameter stored in the cluster parameter memory 2 and sampling data input from the sampling circuit 7 to issue the maximum likelihood.

The likelihood issued from the likelihood operation and comparison circuit 3A is temporarily stored in a modified data memory 8 and is broadcast to a reference data memory 5 in all the processing units PU1 - - - PU100 by way of the transmission line 9. A reference data modification circuit 4 modifies the data stored in the cluster parameter memory 2.

Figure 6:
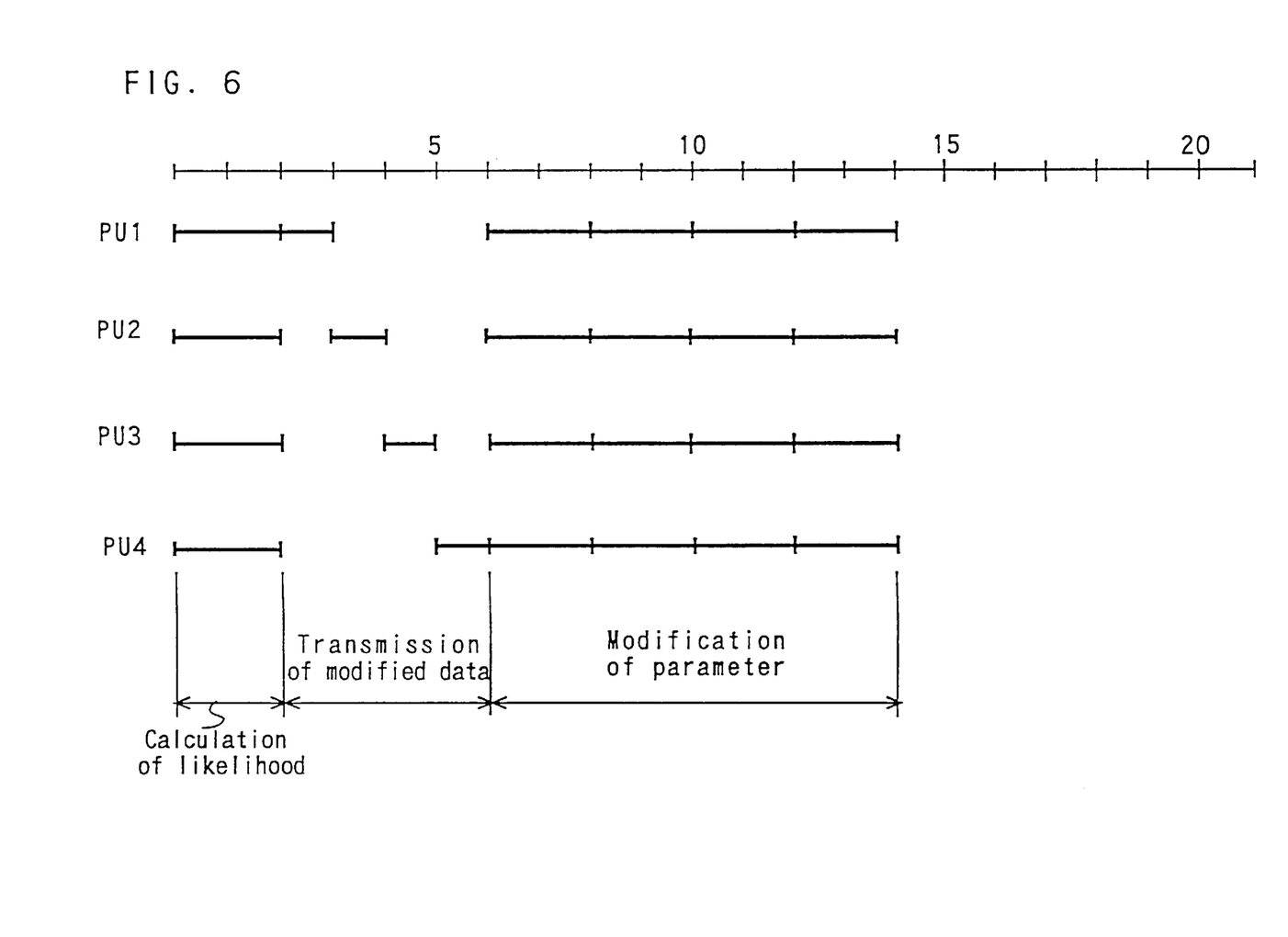
FIG. 6 is a time chart in the second embodiment of the present invention.

Thus, calculation of likelihood is executed by parallel processing for every picture element in all the processing units PU1 - - - PU100. Also, comparison of likelihood is executed by parallel processing in the processing units PU1 - - - PU100. Modification of parameter is sequentially executed in the processing units PU1 - - - PU100 after completion of broadcasting the reference data to all the processing units PU1 - - - PU100. FIG. 6 is a time chart showing the above-mentioned procedure.

In the figure, it takes one time unit to perform the broadcasting of the modified data. As an example, it is supposed that number of the processing units is four and number of the clusters is two. Calculation of likelihood is executed in the first two time-unit. Results of comparison are sequentially broadcast within the subsequent four time-unit. Modification of parameter corresponding to four modification data is sequentially executed in respective processing units PU1 - - - PU100. Therefore, it takes eight time-unit to modify the parameter. As shown in FIG. 6, a total time-unit necessary for completion of the procedures is 14 time-unit. This is very much shorter than the conventional running time (20 time-unit).

Figure 3:
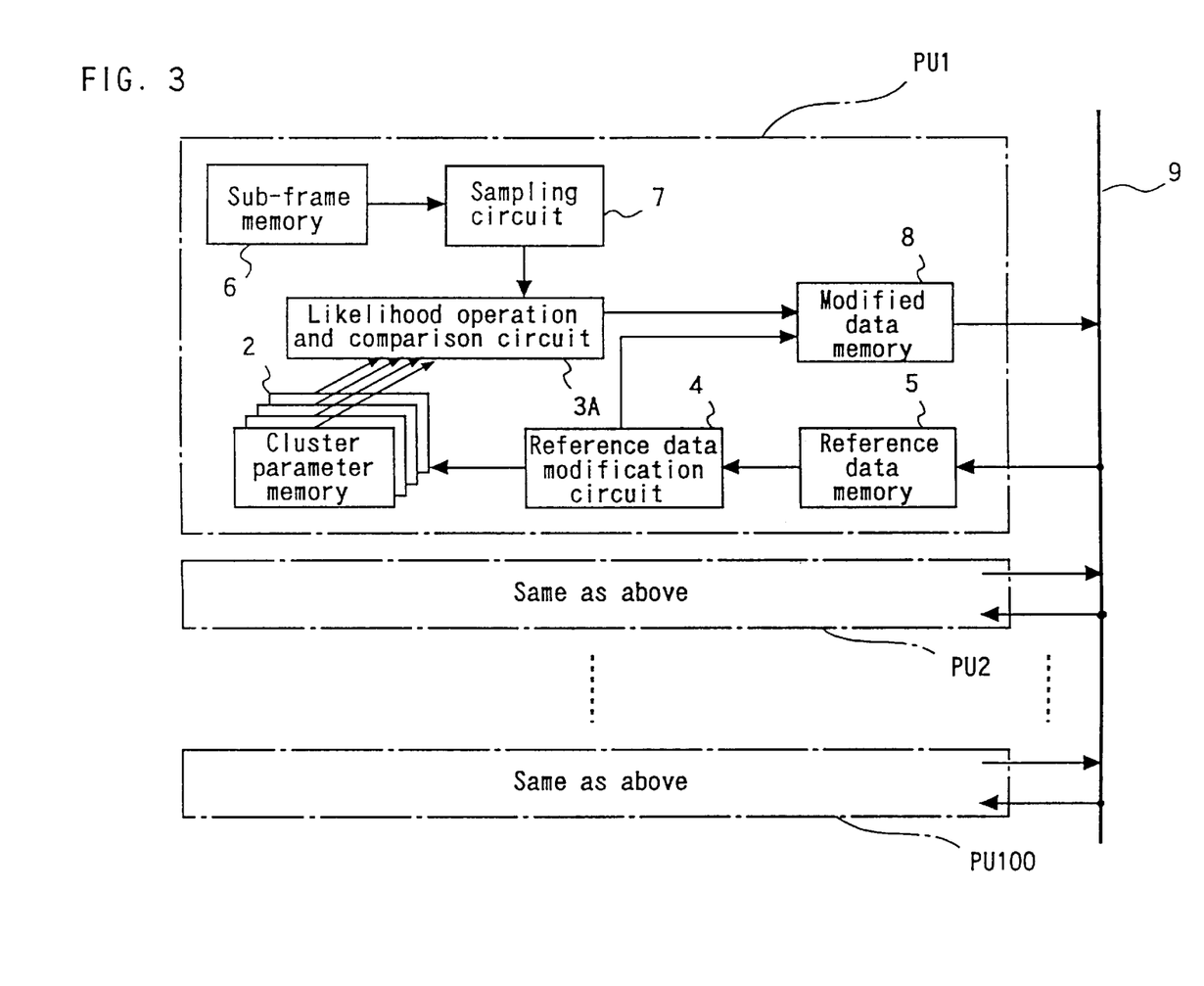
FIG. 3 is a block diagram showing a third embodiment of the present invention.

FIG. 3 is a block diagram showing the parallel image-clustering apparatus of the third embodiment. Corresponding parts and components to the second embodiment are shown with the same numerals, and the description thereon made in the second embodiment is similarly applied. A difference of this third embodiment from the second embodiment is that information of modification is sent to the modified data memory 8 and is broadcast to all the processing units PU1 - - - PU100.

In this embodiment, operation up to the calculation of likelihood is the same as that of the second embodiment. However, the subsequent modification of parameter is executed by a proceeding different from the second embodiment. Modified data issued from the likelihood operation and comparison circuit 3A are temporarily stored in the modified data memory 8 and are sent by way of the transmission line 9 to the reference data memory 5 in the processing unit for handling the cluster to be modified. For example, cluster 1 is handled by the processing unit PU1, and cluster 2 is handled by the processing unit PU2.

Figure 7:
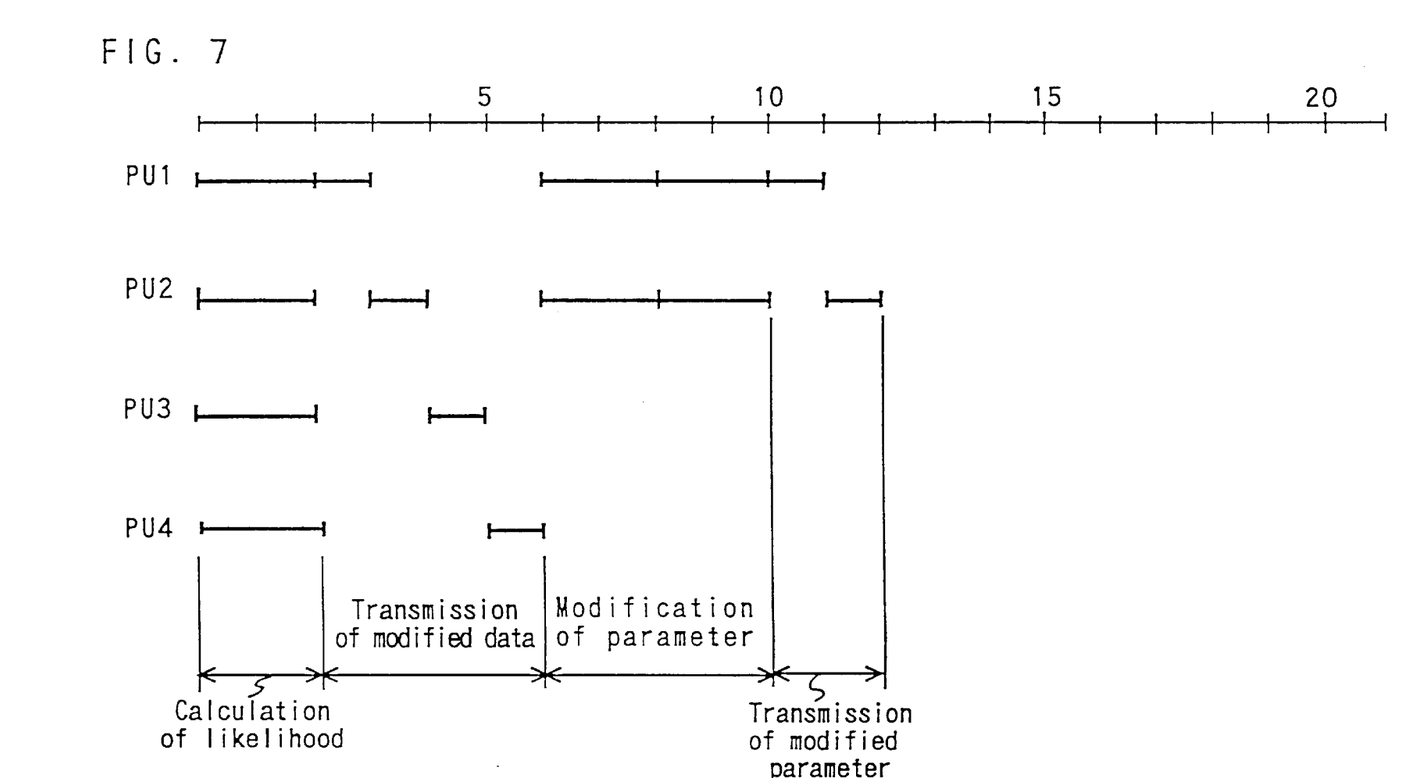
FIG. 7 is a time chart in the third embodiment of the present invention.

In the processing unit PU1, reference data are read out from the reference data memory 5. The reference data modification circuit 4 modifies only contents of the cluster 1 in the cluster parameter memory 2. The processing unit PU2 executes modification of the cluster 2 only. Modified contents are sent to the reference data memory 8 again and are sent to the reference data memories 5 of all the processing units PU1 - - - PU100. Thereafter, each of the processing units PU1 - - - PU100 writes the cluster parameter as it was sent thereto in the cluster parameter memory 2. FIG. 7 is a time chart showing the above-mentioned processes.

In the figure, it takes one time unit to broadcast the modified data, which is similar to the second embodiment. It takes one time unit to transmit the modified data in a transmission form of one versus one. It is also supposed that: four sampling are simultaneously executed; number of the processing units is four; and number of the cluster is two.

Each of the processing units PU1 - - - PU100 executes calculation of likelihood in the first two time-unit and sends results of comparison in the subsequent four time-unit to the corresponding processing unit in the form of transmission of one by one. Since the subsequent modification of parameter is executed twice at each of the processing units PU1 and PU2, it takes four time-unit to do them. The modified cluster parameter is broadcasted from the processing units PU1 and PU2. This takes two time-unit. As a result, it takes 12 time-unit on the whole. This shows that in the third embodiment the entire time unit required is drastically improved as compared by the conventional device which necessitates 20 time-unit. The time-unit 12 is the minimum value in the abovementioned all embodiments.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A parallel image-clustering apparatus for classifying an image into a plurality of clusters each being formed by a set of picture elements having similar natures to each other, said apparatus comprising:

a frame memory for storing therein coded picture elements;

a sampling circuit for reading out picture element information at random from said frame memory;

a plurality of processing units, the number of which is equal to at least the number of said clusters, said processing units each including:
  (a) a cluster parameter memory for storing therein parameters defining each nature of a plurality of clusters,
  (b) a likelihood operation circuit for calculating a likelihood based on said parameters and sampling data of image supplied from said sampling circuit,
  (c) a likelihood memory for storing therein data of a likelihood obtained by said likelihood operation circuit,
  (d) a reference data memory for storing therein plural reference data which is used for modifying cluster parameters supplied from an external circuit, the plural reference data allowing the processing units to modify plural cluster parameters in parallel, thereby reducing the number of time units required to perform image clustering, and
  (e) a reference data modification circuit for modifying data stored in said cluster parameter memory by utilizing said reference data; and a likelihood comparison circuit for comparing together a plurality of likelihoods each stored in said likelihood memory and selecting a cluster having the maximum likelihood, said likelihood comparison circuit inputting reference data to said reference data memory of a processing unit corresponding to a selected cluster.

2. A parallel image-clustering apparatus for classifying an image into a plurality of clusters each being formed by a set of picture elements having similar natures to each other, said apparatus comprising:

a plurality of processing units, the number of which is equal to at least the number of divided images of one image on frame, each of said processing units including:
  (a) a sub frame memory for storing therein a set of coded picture elements of each of said divided images,
  (b) a sampling circuit for reading out picture element information at random from said sub frame memory,
  (c) a plurality of cluster parameter memories each for storing therein parameters defining each of said clusters,
  (d) a likelihood operation and comparison circuit for calculating respective likelihoods based on said parameters and sampling data of an image supplied from said sampling circuit with respect to all of said cluster parameter memories and comparing said likelihoods with each other to obtain a cluster having the maximum likelihood,
  (e) a modified data memory for storing therein modified data issued from said likelihood operation and comparison circuit, and
  (f) a reference data memory for storing therein plural reference data which is used for modifying cluster parameters supplied thereto from an external circuit, the plural reference data allowing the processing units to modify plural cluster parameters in parallel, thereby reducing the number of time units required to perform image clustering, and
  (g) a reference data modification circuit for modifying data stored in said cluster parameter memory by utilizing said reference data; and a transmission line for transmitting said modified data to said reference data memory of each of said processing units.

3. A parallel image-clustering apparatus for classifying an image into a plurality of clusters each being formed by a set of picture elements having similar natures to each other, said apparatus comprising:

a plurality of processing units, the number of which is equal to at least the number of divided images of one image on frame, each of said processing units including:
  (a) a sub frame memory for storing therein a set of coded picture elements of a classified image,
  (b) a sampling circuit for reading out picture element information at random from said sub frame memory,
  (c) a plurality of cluster parameter memories each for storing therein parameters defining each of said clusters,
  (d) a likelihood operation and comparison circuit for calculating respective likelihoods based on said parameters and sampling data of an image supplied from said sampling circuit with respect to all of said cluster parameter memories and comparing said likelihoods with each other to obtain a cluster having the maximum likelihood,
  (e) a modified data memory for storing therein modified data issued from said likelihood operation and comparison circuit,
  (f) a reference data memory for storing therein plural reference data which is used for modifying cluster parameters supplied thereto from an external circuit, the plural reference data allowing the processing units to modify plural cluster parameters in parallel, thereby reducing the number of time units required to perform image clustering, and
  (g) a reference data modification circuit for modifying data stored in said cluster parameter memory by utilizing said reference data; and a transmission line for transmitting said modified data to said reference data memory of predetermined one of said processing units, wherein data-modified in said reference data modification circuit of said predetermined one of the processing units is transmitted to said reference data memory of each of said processing units, and said processing units replace said cluster parameters with data of said reference data memory.

* * * * *